Sheet 1 - 5 Sheets.
R. E. House.
Printing Telegraph.
No. 605.
Reissued Sept. 28, 1858.
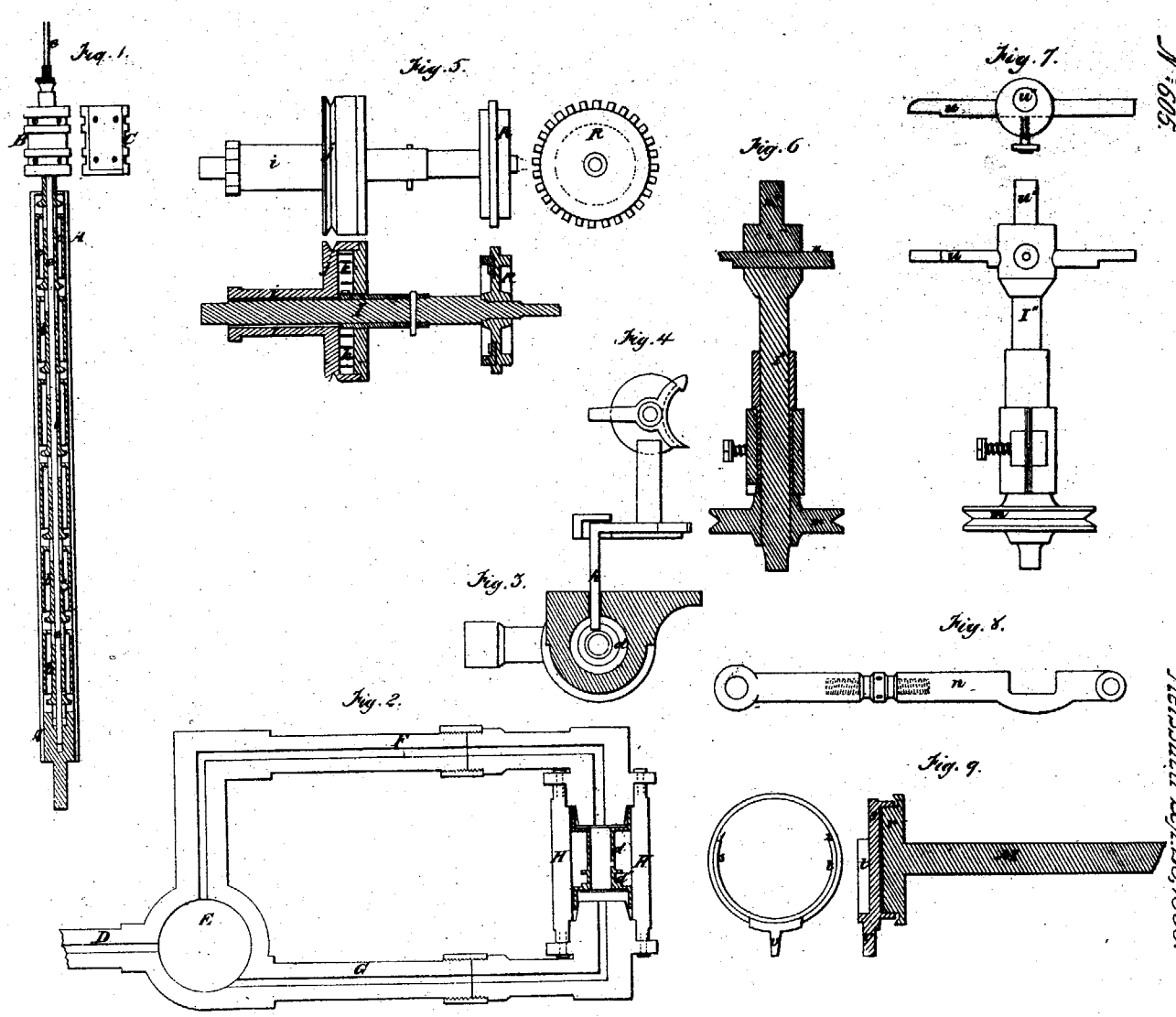

Sheet 2 - 5 Sheets.
R. E. House.
Printing Telegraph.
Reissued Sept. 28, 1858.
No. 605.
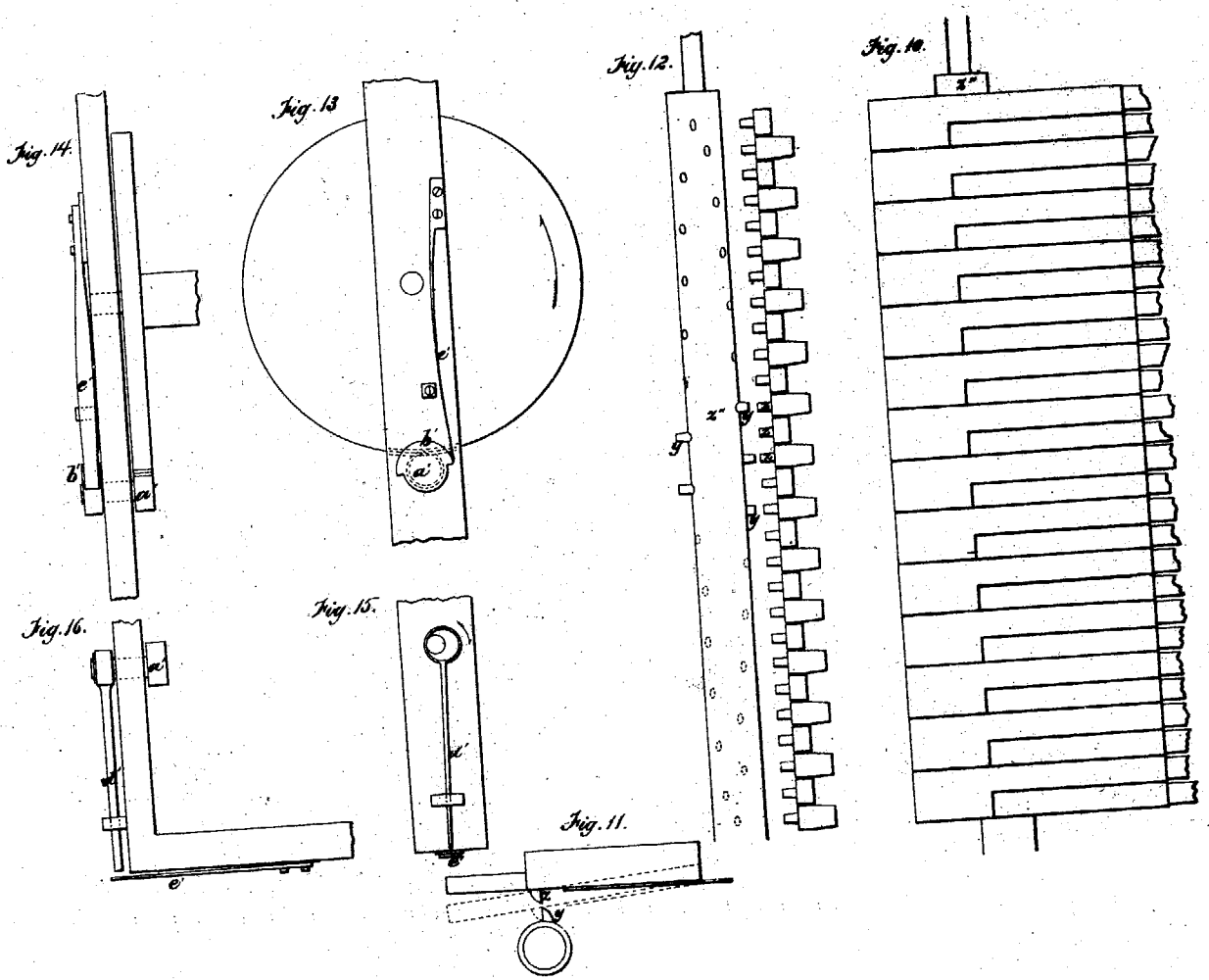

Sheet 3 - 5 Sheets.
R. E. House.
Printing Telegraph.
Reissued Sept. 28, 1858.
No. 605.
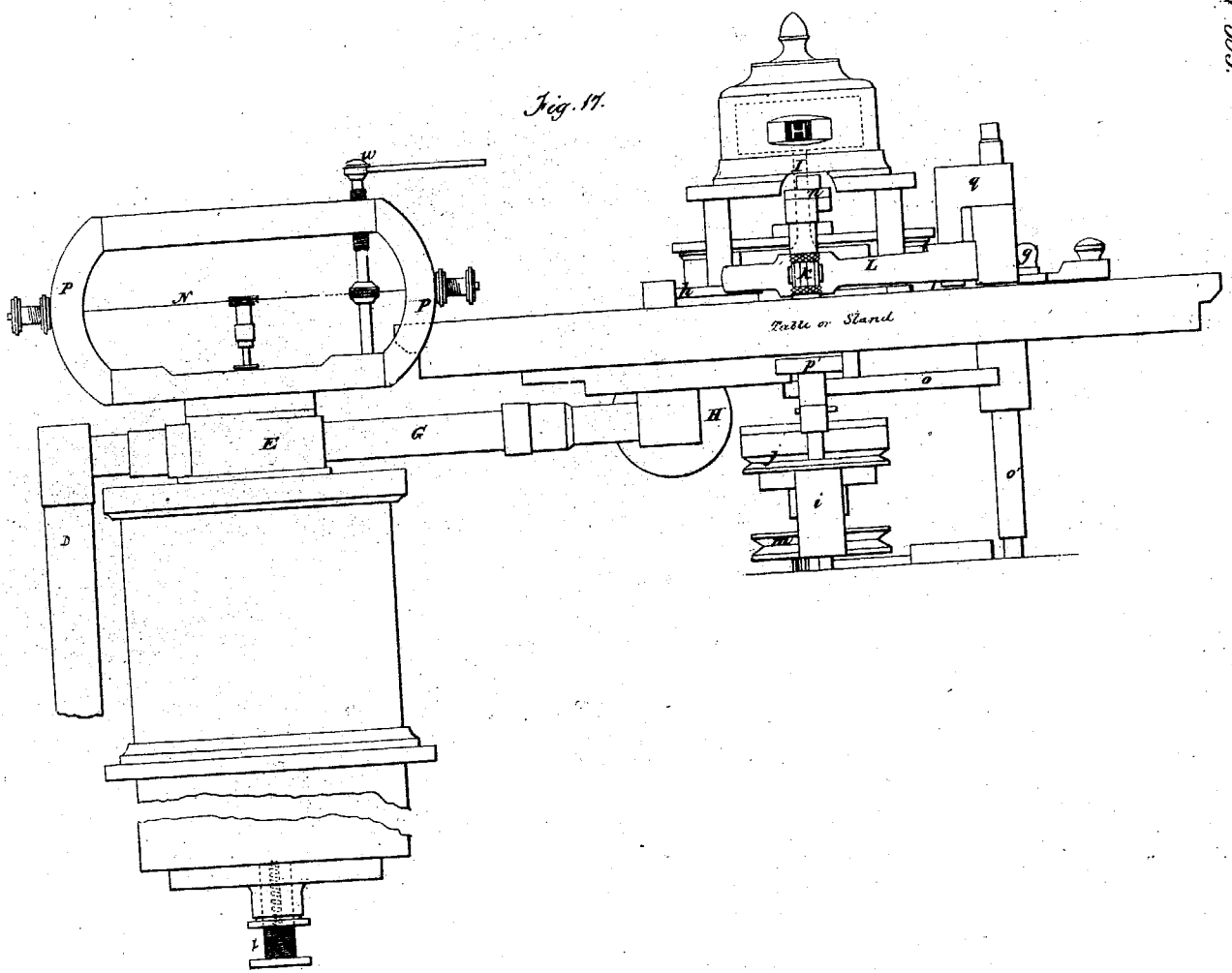

Sheet 4-5 Sheets.

R. E. House.

Printing Telegraph.

Reissued. Sept. 28, 1858.

No. 605.

R. E. House.

Sheet 5-5 Sheets.

Printing Telegraph.

No. 605.

Reissued Sept. 28. 1858.

UNITED STATES PATENT OFFICE.

ROYAL E. HOUSE, OF BINGHAMTON, NEW YORK.

IMPROVEMENT IN MAGNETIC PRINTING-TELEGRAPHS.

Specification forming part of Letters Patent No. 9,505 dated December 28, 1852; Reissue No. 605, dated September 28, 1858.

*To all whom it may concern:*

Be it known that I, ROYAL E. HOUSE, now of Binghamton, county of Broome, State of New York, and formerly of the city of New York, in the United States of America, have invented and discovered new and useful apparatus, methods, and means of printing as fast as the types are selected by the compositor, which I call "House's Composing Printing-Press;" and I do hereby declare that the following is a full, clear, and exact description of the same, reference being had to the annexed drawings, making a part of this specification, in which—

Figure 18:
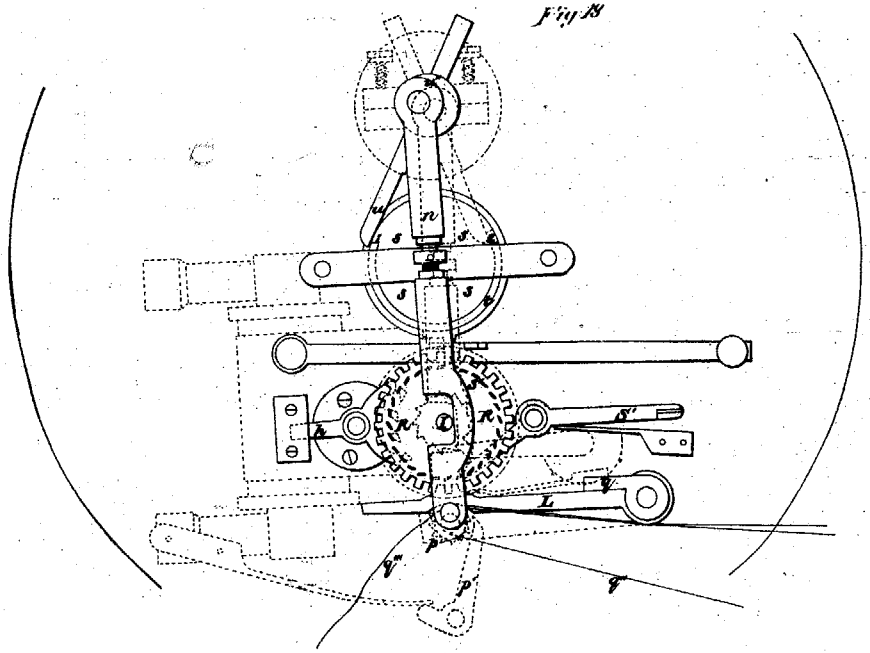

Plate I is a perspective view of the machine. Plate II, Figs. 17 and 18 are elevation and plan. Plate III, Figs. 1 to 9 are parts in detail. Plate IV, Figs. 10 to 16 are also parts in detail.

Similar letters will refer to similar parts throughout unless otherwise specially noted.

The nature of my invention and improvement consists in certain machinery, for composing and printing at the same time and at one operation, which machinery, when combined with electrical or galvanic apparatus, is capable of effecting the operation of immediately printing any characters which may be selected by the compositor, even though the printing-press be removed to a distance from the composing-machine; and therefore I design by the use of electrical apparatus to apply, among other things, the said machinery to the publishing messages in ordinary typography, and also signalizing messages at great distances as means of communicating intelligence.

Included in my said composing printing-press are several parts which are described by me in my Letters Patent dated the 18th of April, 1846, and which I shall include in the following description, and then point out and define the new parts for which I now seek Letters Patent.

My composing printing-press, as adapted and employed to print at a distance from the compositor, for communicating intelligence to distant places by using a current of electricity or galvanism, may be better understood by being described under five general divisions of parts.

The first division consists of machinery and apparatus placed at the station from which the intelligence is to be transmitted, and which is employed in breaking and closing a circuit of electric or galvanic conductors and detaining the same, either broken or closed, and which I call the "composing-machine."

The second division consists of electrical or galvanic apparatus for producing a current of electricity or galvanism to connect the composing-machine with a pneumatic apparatus or its equivalent in such manner as to secure an intermittent action of the force of compressed air in the desired direction.

The third division consists of a pneumatic apparatus connecting the electrical apparatus with the printing machinery and combining the force of compressed air or steam or other like substance with magnetic force.

The fourth division consists of the machinery used for printing, to be located at the station where the intelligence is to be received, and which I call the "printing-machine;" and the fifth division consists of some prime mover, properly geared or connected, to operate the various parts.

The composing-machine, for greater clearness of description, may be divided into two parts, which I will describe as the first and second parts of the composing-machine.

The first part consists of a set or system of finger-keys similar to the finger-keys described in my Letters Patent above mentioned, except that I now arrange them in a double row, more like the keys of a piano-forte, the precise arrangement being, however, immaterial except as a matter of convenience. Fig. 10, Plate IV, is a plan of the keys, and Fig. 11 is a sectional view of keys and the shaft under the keys, each key having a spring under it to raise it up after being depressed, and each key has a detent-catch, *z*, on its under side. The letters or characters corresponding with those to be printed or represented are formed upon the tops of the keys, one on each key, as seen in Plate I.

Figure 20:
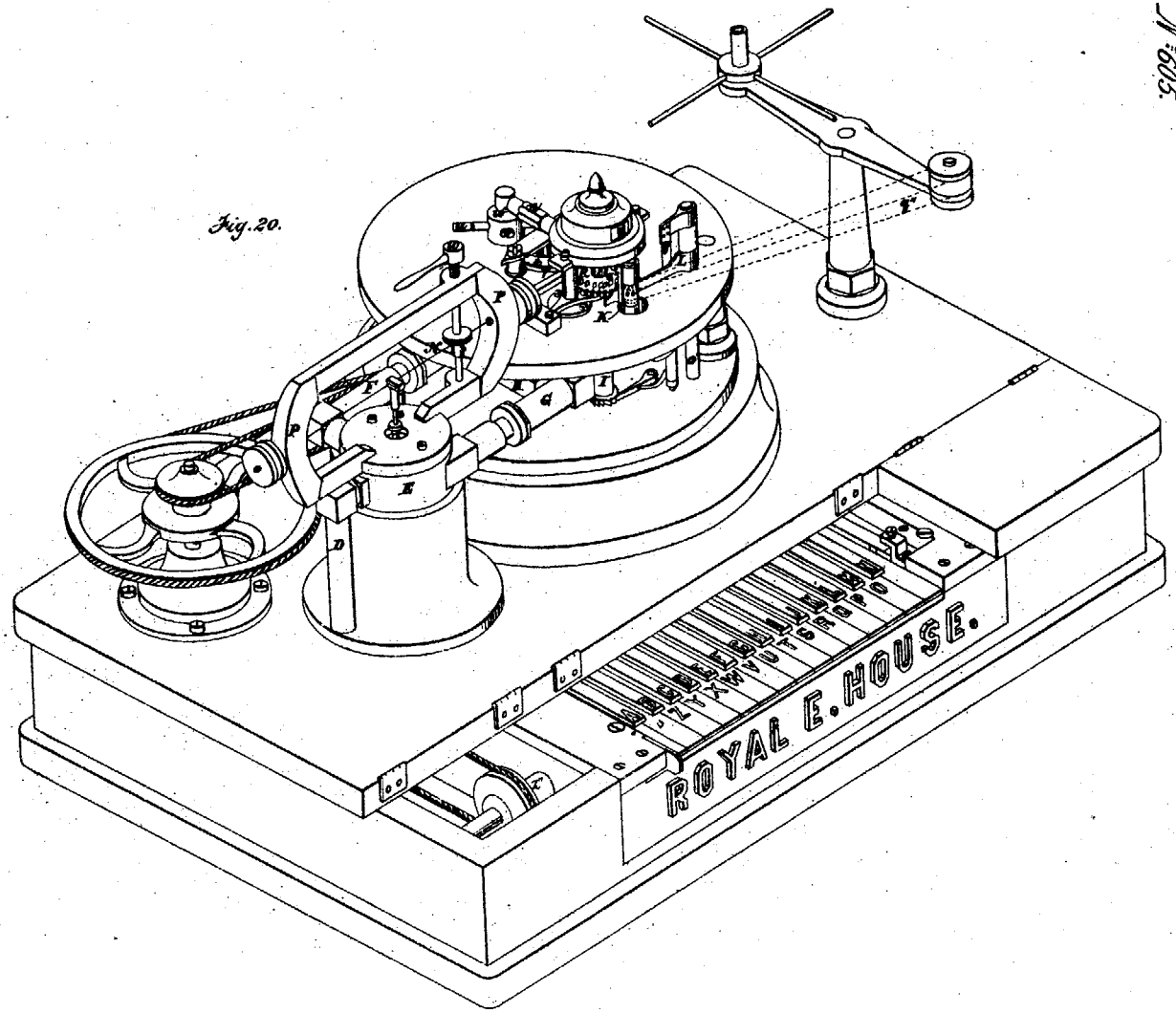

The second part of the composing-machine consists of a shaft, *z''*, Figs. 10, 12, and 20, placed under the set of keys, and having projecting from its surface small detent-pins *y*, one for each key, which may be arranged in any convenient form upon the shaft; but I prefer arranging them in two spiral rows. On one end of the shaft may be a cog-wheel, substantially like that described in my said Letters Patent, containing half as many cogs as the number of letters or characters to be printed or represented, and, of course, an equal number of spaces between the cogs, making the spaces and cogs together equal to such number of characters or letters, and so adjusted that each space and cog will have a corresponding detent-pin and detaining-key. Said wheel forms one pole of the circuit of conductors, and the other pole is connected with the cogs of said said wheel, so that the pole of the conductor connected with the cogs will alternately come in contact with each cog and pass through or over each space between the cogs as the shaft and wheel revolve. This part of the apparatus may be varied by having on the end of the shaft a cog-wheel adapted to carry a pinion and shaft on which is a segment of a wheel connected with one of the poles of the circuit of conductors. Fig. 12 is a front elevation of the shaft, showing the spiral rows of detent-pins. Fig. 13 is an end of the cog-wheel pinion and segment of a wheel, *a'* being the pinion and *b'* being the segment of a wheel. Fig. 14 is a plan of the same, together with the end of the circuit of conductors, *e'*. This cog-wheel and pinion are so made that the pinion and its shaft, and consequently the segment, will revolve fourteen times while the key-shaft and its wheel revolve once; and the pole of the conductor *e'* is made to slightly spring and come into contact with the segment each time it revolves, and thus the circuit of conductors will be broken fourteen times and closed fourteen at each revolution of the key-shaft.

Another way of arranging the apparatus for breaking and closing the circuit is to attach to the pinion-shaft above described, by an eccentric, a rod, *d'*, Figs. 15 and 16, so that as the pinion *a'* revolves the free end of the eccentric-rod is brought into contact with the pole *e'* and separated from it, the pole *e'* being provided with a spring for the rod to act against.

The object of this composing-machine is to enable a compositor or operator to open and close and detain a circuit in a broken or closed condition, at his option, so that a key struck shall properly locate a corresponding letter in the printing apparatus. This object is accomplished in the manner described in my before-mentioned Letters Patent, or by means of the modifications shown in Figs. 13, 14, 15, 16, or any others which are mechanical equivalents for the purpose desired.

The second general division consists of a circuit of insulated electric or galvanic conductors, a galvanic battery or other known generator of electricity or galvanism, an electro-magnetic apparatus, (which I call the "combination electro-magnet,") and a valve, (which I call the "balance-valve,") or their equivalents. The new parts of this division consist of the construction and use of the combination electro-magnet and a balance-valve. A A of Fig. 1, Plate III, is a section of the combination electro-magnet, which is constructed thus: Within a case, *a a*, which may be a tube, and made of any suitable material, except such as will become magnetized by a current of electricity or galvanism, are located a series of hollow cylindrical pieces of iron, *c*—say about three-fourths of an inch long and of such diameter as to set snug in the case. These I call the "fixed magnets." They should be a short distance apart—say about half an inch—and about one-tenth of an inch thick. One end of each of these fixed magnets should be partially inclosed by an end piece, leaving a small hole in it to admit a rod, *e*, of any suitable material which will not become magnetized by a current of electricity or galvanism. This rod extends through the whole series of these magnets, and is prolonged beyond them at the upper end of the case, and on it are strung other pieces of iron, *b*, which I call the "movable magnets." They are of a cylindrical form, enlarged at the bottom, forming a flange, as shown in the drawings, and are fixed tightly upon the rod *e* in such positions that when the rod descends each lower end of these movable magnets may come in contact with an upper end of a fixed magnet. Strung upon the rod between the movable magnets are washers, separating them and covering those parts of the rod which pass through the upper ends of the fixed magnets. These washers should consist of material not susceptible of becoming magnetic by a current of electricity. When thus constructed and arranged, the case *a* is to be placed within a helix or coil of insulated wire, substantially in the usual manner of making the coil around iron to form an electro-magnet. The rod carrying the movable magnets is to play easily up and down. Thus finished, it will be obvious to those acquainted with the science, that such a magnet combines repulsion and attraction. Thus, when a current of electricity or galvanism traverses the coil or helix of wire, both the fixed magnets and the movable magnets become magnetized, when the lower enlarged ends of the movable magnets and the upper ends of the fixed magnets will attract each other and the movable rods will be impelled out of their containing-cylinders; and also that these forces—attraction and repulsion—both act in the proper direction to cause the movable magnets to approach the upper ends of the fixed magnets; and by this combination-magnet, of which I claim to be the first inventor and discoverer, I secure the strength of a horseshoe-magnet combined with the rapidity of motion attainable by the use of a short cylindrical or bar magnet.

To the end of the rod *e* extending above the case, is attached a fixture which I call a "circular balance-valve," of which B is a front view and C a vertical section. This valve is made in the form of a short hollow cylinder, having three narrow grooves cut in the outer circumference, as clearly shown, and with holes through its sides from the bottom of each of the two end grooves, as shown. This valve moves in a cylindrical valve-chamber, E. The use of this valve is to admit air or gas or vapor to act on a piston as ordinary steam-engine valves do, and it performs in the combination only the duties of such well-known valves, and as such valve is moved by the comparatively small force exercised by a magnet, that force therefore governs and controls the great power that may be derived from compressed air or steam, the former being, so to speak, the will which regulates the operation of the latter.

The third general division, which I call the "pneumatic apparatus," consists of cylinders, pipes or tubes, piston, escapements, and air-pump, arranged as a means of using the force of air in any system of transmitting intelligence. These parts (except the air-pump, which may be of an ordinary form, and which is too well known to require a drawing) are best shown by Figs. 2 and 3, Plate III. A pipe, D, to conduct air extends from an air-pump and enters the valve-chamber E, and pipes F and G extend from either side of the valve-chamber and communicate with the ends of a cylinder, H. This contains a light hollow piston, *d*, made as shown in Figs. 2 and 3, and having a groove, *d''*, around it to receive the end of a lever, *h*, attached to an escapement which it moves. The manner in which these several parts are connected is more clearly shown in Plates I and II, and the operation of this apparatus will be that the piston in the cylinder H will be made to move back and forth by the air passing through F and G, those pipes being rendered alternately injection and exhaust pipes by the action of the valve in E, in a manner common to reciprocating engines, the valve being moved in one direction by the action or force of the magnet when a current of electricity is passed through the coil, and being drawn in the other direction by a tension wire or spring, hereinafter described. The operation of the escapement as acting on the type-wheel is the same as set forth in my Letters Patent before quoted.

The fourth general division is the printing-press, and for greater clearness may be described in three parts.

The first part consists of a type-wheel, (signal-disk, if desired,) spring-pulley, &c. The type-wheel is constructed substantially as described in my said Letters Patent, except that the escapement-teeth are formed upon a flange which is attached to the wheel to admit of being more easily replaced when worn out. The type-wheel is shown at R in Fig. 5, and the position it occupies in the machine is shown in Figs. 18 and 20. Toward the end of the shaft on which the type-wheel revolves is a sheath, *i*, Figs. 5 and 17, through which the type-shaft runs, and on this sheath is a pulley, *j*, to which the power of a prime mover is applied which propels the type-wheel. Within this pulley is a spring, K, similar to a clock-spring, one end being attached to the shaft I and the other end resting against the inside of the pulley, and so adjusted that the type-wheel and its shaft are carried only by the friction of the detached end of the spring bearing against the inside of the pulley, and that when the motion of the type-wheel is arrested the spring will be in a state of tension, and accelerate the starting of the wheel when it shall be again liberated by means of this or any equivalent friction-connection between any prime mover and a type-wheel. Such wheel may be restrained in its motion or stopped without stopping or altering the speed of the prime mover, and any friction-connection known to mechanics will, when combined with a type-wheel for this purpose, be an equivalent, and the action of the spring, compressed when the wheel is moving and aiding to start the wheel when released, is important, and springs producing such result may be applied with advantage to all wheels of printing-telegraphs that are at times at rest and at times moving, and the kind, location, and connection of such spring may be variously modified without departing from the principles of my invention, so long as so combined with an alternately moving and stopping wheel as to effect the above-set-forth purpose of aiding to start a wheel into rotary motion when released by a dog or detent. The shaft I is prolonged above the table or stand, as represented by the dotted lines in Fig. 17, and on it, near the top, is placed a disk, as is also represented by dotted lines in said Fig. 17, with "letters," "blank," and "period" on the outer circumference corresponding with the letters, blank, and period on the type-wheel. This disk may be covered with a cap or case with a hole in the front, through which a letter—as, say, "H"—is shown, as in Figs. 17 and 20.

The second part of the fourth general division is that portion which causes the paper to approach and recede from the types at the proper times and the paper to advance to space the letters, together with the apparatus for supplying the coloring-matter. This part consists of the upright shaft I'', Figs. 6 and 7, with its friction apparatus, connecting-rod with its crank-pin, toothed cylinder and its several springs, ratchet-wheels, and pawls, and the endless band and fixtures for supplying the coloring-matter. A portion of the shaft I'' is inclosed in a sheath carrying a pulley, *m*, to which the propelling-power is connected, so that the shaft I'' is moved by the friction of the sheath in the same manner as described for carrying the type-wheel. This shaft extends a short distance above the table, having a crank-pin, *u''*, on its upper end, as shown in Figs. 7, 18, and 20. To this crank-pin one end of a connecting-rod, *n*, Figs. 8, 18, and 20, is attached. The other end extends horizontally across and beyond the type-wheel and operates upon the shaft upon which the small upright toothed or spurred cylinder K plays, as shown in Figs. 17 and 20. This toothed cylinder-shaft is supported at the lower end by an arm, *o*, Fig. 17, attached to a vibrating post, *o'*. By this arrangement it will be observed that the toothed cylinder K is caused to approach and recede from the type-wheel at each revolution of the shaft I'', as the connecting-rod moves to and fro during such revolution. On the toothed cylinder K, near the lower end, is a ratchet-wheel, *p*, (seen in dotted lines in Fig. 18,) with a suitable pawl, *p'*, and spring to cause the toothed cylinder to revolve the distance desired to have left as a space between the letters to be printed at each advance and recession of the toothed cylinder K. The modes of arranging the ratchets and springs are so various and simple as to require no detailed description. An arm, L, Figs. 17, 18, 20, is placed in a horizontal position, turning on a joint sufficiently to vibrate a short distance, and its detached end comes between the toothed cylinder K and the type-wheel, a slot being cut through the said arm opposite the types sufficient to admit a type through. On the side of this arm opposite the toothed cylinder is a spring, *q*, to hold the arm up to the toothed cylinder, the arm having in addition two small grooves for the teeth to pass through as the toothed cylinder revolves. An endless band, (seen at $q^2$, Figs. 18 and 20,) charged with plumbago or other suitable coloring-matter, runs around the toothed cylinder K at one end and a roller at the other, the direction being such as to cause said band to pass between the toothed cylinder and the detached end of said arm L. The ribbon of paper on which the printing is to be done is to pass through between the endless band and the said arm, as shown at $q^3$, Fig. 18. Thus arranged, the arm L holds the paper against the teeth or spurs of the cylinder, so that as the cylinder revolves the teeth carry forward the paper; and when the cylinder is caused to approach the types, as above described, it carries with it the arm L, the band, and the paper. The paper is thus pressed against the type through the slot in the arm, making a corresponding pressure of the paper upon the prepared band, by which a distinct letter is printed on the side of the paper next (P) the band and opposite the type.

The third part of the fourth general division is the detaining apparatus for regulating the motion or action of the second part of the fourth general division, and consists of a shaft, *m*, (shown in detail in Fig. 9,) having attached to the upper end a disk, *r*, with flanges projecting up from its outer edges. This disk carries a friction-cap, *s*, which sets in it, the shaft and cap having the positions shown in Figs. 18 and 20. This cap has a rim or flange, *t*, on the upper side, extending, say, about two-thirds the distance around the cap. The ends of this rim or flange act as detents, and pins inserted in its upper surface would subserve a similar purpose. The shaft I'', Fig. 7, carries a detent-arm, *u*, Figs. 7, 18, and 20, which acts upon the ends of this flange *t*, so that as the shaft I'' revolves, said detent-arm first takes the shoulder 2, Fig. 18, and remains in that position till the friction-cap *s* is a little turned, when it slips off of the shoulder 2 and takes upon the shoulder 1. The shaft *m* is, during the working of the machine for the purpose of printing, kept in constant revolution by means of a proper connection (not necessary to describe) with a prime mover, such motion being in the same direction as that of the type-wheel shaft in the arrangement of machine as a whole shown in the drawings, and this shaft would carry the friction-cap along with it unless it were held fast; but from this cap projects a detent or arm, *v*, Fig. 9, which is acted upon by pins or projections *s''*, Figs. 18 and 20. These pins or tappets, as the type-wheel revolves, strike in quick succession against the arm *v* and drive the cap in one direction as fast as its friction-connection forces it to revolve in the other, thus keeping the cap in a state of constant oscillation, not of sufficient extent, however, to let the shoulder 2 fall back so far as to release the detent *u*, (see red lines, Fig. 18;) but when the type-wheel stops, then the arm, not being struck by the next succeeding pin, permits the friction-cap to be revolved so far that the shoulder 2 releases the detent, which immediately flies around with its shaft, the latter, by its revolution and through the connections before described, bringing up the paper-cylinder to the type-wheel. This partial revolution of shaft I'' continues until the detent strikes shoulder 1, when the shaft rests again, and so remains until the type-wheel again begins to move. One of the pins then strikes *v*, moves the cap so as to draw shoulder 1 away from the detent, which then flies against 2, and remains there until the type-wheel stops again. Now, this method of causing the printing to take place at the stopping of the type-wheel is important, and the mechanical elements which are active in performing the duty are a series of pins or their equivalents on a wheel which moves and pauses, and an arm connected with two detents or shoulders, the two latter having, through the agency of some prime mover, a constant tendency to move in a direction opposite to that which they derive from the action of the pins. The rod *e*, Fig. 1, which connects the movable magnets to each other and to the air-valve, extends beyond that valve and is attached to a delicate wire thread, N, Figs. 17 and 20, which is stretched tightly in a frame, P, by screws, and the screw *w* is for raising or lowering the wire. To the lower end of the magnet-case is attached a screw and nut, *x*, Fig. 17, to raise and lower the case A and fixed magnets, by which means the relative position of the fixed and movable magnets can be easily adjusted, and this wire acts as a spring to move the valve in one direction. The movable magnets should not be allowed to quite touch the fixed magnets.

The fifth general division of the apparatus is the prime mover, not shown in the drawings, as any known prime mover may be employed, such as descending weights, steam, compressed air, falling water, or animal power.

In the form of my apparatus represented in the drawings the prime mover used is to be connected, first, to the key-shaft, so as to keep it in revolution whenever released by the key-detents; second, to the pump, so as to keep up a supply of compressed air; and, thirdly, so as to revolve a shaft, such as that seen at the left hand of Fig. 18. This shaft is provided with appropriate pulleys, from which, by means of bands and other pulleys, the four shafts of the type-wheel, of the cog-wheel for making and breaking circuit, of the friction-cap, and of the crank that bring up the paper-cylinder are to be kept in revolution, it being noticed that the first and third are to be driven in the same direction and the latter in an opposite direction when the parts have the relative location and arrangement shown in the drawings. When bands are used they may, by nice adjustment, be made to perform the duties of the friction-connections, so far as permitting the various wheels to rest while the prime mover is acting is concerned, and would be equivalents of such connections for that purpose; but I prefer to use friction-couplings, and then I can, if desired, make cog-wheel connections between the prime mover and the various shafts. Moreover, it is well that all moving parts moved by the prime mover and stopped at intervals should be of little weight, so as not to jar the machine needlessly, and for this reason I prefer to make the friction-connections as near as possible to the acting parts that are required to rest or be retarded while the prime mover keeps up its speed.

In using my said composing printing-press to print at such distances from the compositor as it can be done by dispensing with electricity and using long pipes to conduct the air, the cogs of the wheel on the key-shaft described above for breaking and closing the circuit of electric or galvanic conductors are made to carry a pinion so adjusted as to revolve fourteen times while the key-shaft revolves once. The valve B is then to be connected with the pinion-shaft by a connecting-rod with either a cam or eccentric. The connection may also be made by clock-work, so as to cause the valve to descend fourteen times and ascend fourteen times at every revolution of the key-shaft.

The above modification is to be used when I connect the printing-machine with the valve B by long pipes to conduct the air, and when the valve B is to be near the composing-machine; or, in case the printing is to be done at the same place or in the same room where the composing-machine is stationed, the valve B and pneumatic apparatus may in certain cases be dispensed with and the key-shaft connected by any suitable mechanical device with the escapement to cause it to vibrate fourteen times each way at every revolution of the key-shaft; or the type-wheel itself may be placed upon the key-shaft.

In using steam instead of air in operating my said composing printing-press no essential alteration of the mechanism is necessary, except substituting any known generator of steam instead of the air-pump and connecting therewith the pipe D to conduct the steam into the valve-chamber, when it will pass through the various passages similarly to the air, as described; but from experience I have found the use of air preferable to that of steam.

In operating my said composing printing-press it is necessary that both the type-wheel and key-shaft should start from the same letter or character, in order that they may keep time with each other thereafter; and for this purpose I use a blank on the type-wheel and a corresponding detent finger-key and pin on the key-shaft as the starting-points, and in case of printing at distant places as a means of communicating intelligence some means is necessary by which the operators at the respective stations can start their respective machines at these points. For this purpose a spring and key, $g'$, of Fig. 18, is so arranged that by moving the key with the finger it takes into a stop on the type-wheel and stops it at blank. By pressing down the blank detent finger-key the key-shaft will also be stopped at blank. To regulate the machines the operators interchange signals in any preconcerted manner by means of the electric current, and each stops his machine at blank by the use of the above-named keys. Both are then liberated, first the type-wheel and then the key-shaft, and the machines then run with regularity.

The transmission of intelligence and the printing of it are as follows: One pole of the circuit is resting on the rotating circuit maker and breaker, and the wire connected therewith is in connection with the helical coil around the magnet of the distant machine. The type-wheel of the distant printing-machine is at blank, and the key-shaft in electrical connection with it at the near machine is at blank also. All the shafts are in rotary motion, and a current of air is being propelled through the machine from the air-pump, entering by the pipe D. The inking-band $q''$ and the strip of paper are in order, as described, to receive the pressure of a type when ready to be given. The key-shaft, in revolving, breaks and closes the circuit fourteen times in one revolution. The magnet vibrates a like number of times. The piston $d$ and the escapement $h$ the same, producing one revolution of the type-wheel. If, now, the eighth letter, H, of the alphabet is to be printed on the distant machine, press down key H. The key-shaft continues to revolve until the eighth detent-pin comes opposite to the stop, and then is stopped. The type-wheel, having kept equal time in its revolution with the key-shaft, stops at the same instant, because the alternate breaking or closing of the circuit pauses for a moment as long as the key is held down, and arrests the vibration of the magnet, and, of course, the escapement with it. The place where the type-wheel it stopped is where the letter H is opposite to the shaft K, and consequently just where is should be to receive the pressure of the paper and thus produce the impression of H upon it, as has been described. At the same instant the disk *s* follows the motion of its shaft farther than the pins permitted it to do while the type-wheel was moving, and moves the stop 2 upon it, whereby the detent *u* is released and flies round by the revolution of I″ until the detent strikes shoulder 1, the crank-pin *u′* being thus permitted, through the agency of the connecting-rod, to force the spurred cylinder with its paper and ink-band against the letter H of the type-wheel, thus printing that letter. As soon as the key H is released the key-shaft and type-wheel begin to move, the disk *s* is moved back to its original position, and the lever *u* is released by shoulder 1 and is caught, as before, on 2. As the connecting-rod moves the paper cylinder the pawl *p′* plays in the ratchet *p*, moving it round one notch. This carries on the paper and inking-band and spaces the distance apart of the letters. It must be borne in mind that the key must be held down until the letter is formed, not being released until the next key is depressed for the printing of the next letter. If I is to be printed, it will be effected by either breaking or closing the circuit. If H was formed by closing the circuit, then I will be formed by breaking it, and the key will hold the key-shaft, so that the circuit-wheel is at a space. The magnet immediately rises—that is, makes one vibration—lifting the air-valve so that the air will pass upon the opposite side of the piston *d* and move the escapement one notch, and thus permit the type-wheel to move the distance required to bring the next letter—viz., I—to the place before occupied by H, the impression being given to it as before. If the next to be printed is six letters off, the circuit-wheel moves three spaces and three cogs, thereby breaking and closing the electric current that number of times, producing a like number of vibrations, and each vibration counting for a letter. Thus, if the letter B were printed and it were necessary to print A next, there would be a number of vibrations equal to the whole alphabet less one; but from A to B there would be but one.

The printing-machine shown in Fig. 20 is not necessarily connected with the keys in the manner shown, but is connected with another set of keys from a distance. However, as but one conductor is ordinarily used, the keys to each machine operate on both presses. This is useful, as by means of the disk placed upon the type-wheel shaft having letters printed upon it to match those on the type-wheel, as shown at H, the operator can watch for errors or derangements between the two.

Now, I wish it distinctly understood that many parts of my invention may be used out of connection with the others, having at times substituted for those others either equivalents or analogous machinery, which, with them, will make up a printing-telegraph.

What I claim as of my own invention, and desire to have secured by Letters Patent, is—

1. The employment of force derived from an electro-magnet to govern and regulate a force derived from the use of compressed air or other fluid, substantially in the manner and for the purpose specified.

2. An electro-magnet constructed substantially as described—that is to say, when made up of a series of hollow stationary and moving magnets arranged, substantially as specified, so as to effect the movement of a rod or axis on which the latter are mounted, substantially in the manner set forth.

3. A valve substantially such as is specified, in combination with any electro-magnet to move that valve, and a piston, or its equivalent, whose motions are effected by the pressure of air or fluid, whose action is controlled by such a valve, the combination being substantially such as is specified.

4. An endless band acting as a reservoir of coloring-matter, and arranged substantially in the manner and for the purpose specified, in combination with paper and a series of types and a spurred cylinder, so as to record characters when pressure is applied.

5. In combination with a key-board at one locality and a printing apparatus at another, or in combination with both a key-board and a printing apparatus at each locality, a detent or stop moved by the hand of the operator for arresting the motion of a type-wheel at one determined and fixed point, when there is combined therewith a key corresponding, when the parts are in proper position, with that determined and fixed point, the detent and key being substantially such as specified.

6. Driving a type-wheel of a printing apparatus by means of a friction-connection substantially such as is described between it and a prime mover, so that the motions of the former may be modified or its motion stopped without causing the motion of the latter to be stopped or modified.

7. Combining with a wheel of a printing-telegraph, which must at times stop and at other times be in motion, a spring compressed by the action of the parts when in motion and exerting its force to start the wheel when released from any detent that may arrest its rotation, the combination being substantially such as to effect the purpose set forth, substantially as described.

8. Causing the paper to be printed to approach the type which is to impress it by means of a friction-connection with a prime mover, so that the latter may remain in motion while the former is at rest, substantially in the manner set forth.

9. The apparatus, substantially as herein set forth, for governing the approach of paper to a type-wheel that at times moves and at others stops, so that the apparatus which brings up the paper shall act for that purpose when the type-wheel ceases to revolve for a longer period than usual.

10. In combination with a type-wheel of a printing-telegraph, a spurred or toothed cylinder substantially such as is specified, the latter causing the paper to progress as the purposes of printing by the types on the former may require, substantially as set forth, in combination with another surface, substantially such as is specified, to press the paper upon such spurs, in the manner substantially as described.

In testimony whereof I have hereunto subscribed my name, in the city of New York, on this 5th day of August, A. D. 1858.

ROYAL E. HOUSE.

In presence of—
MELVILLE V. BIGGS,
GERARDUS C. KING.